Jan. 12, 1937.  J. A. J. BENNETT  2,067,228
ROTARY SUSTAINING WINGS FOR AIRCRAFT
Filed May 22, 1934  2 Sheets-Sheet 1
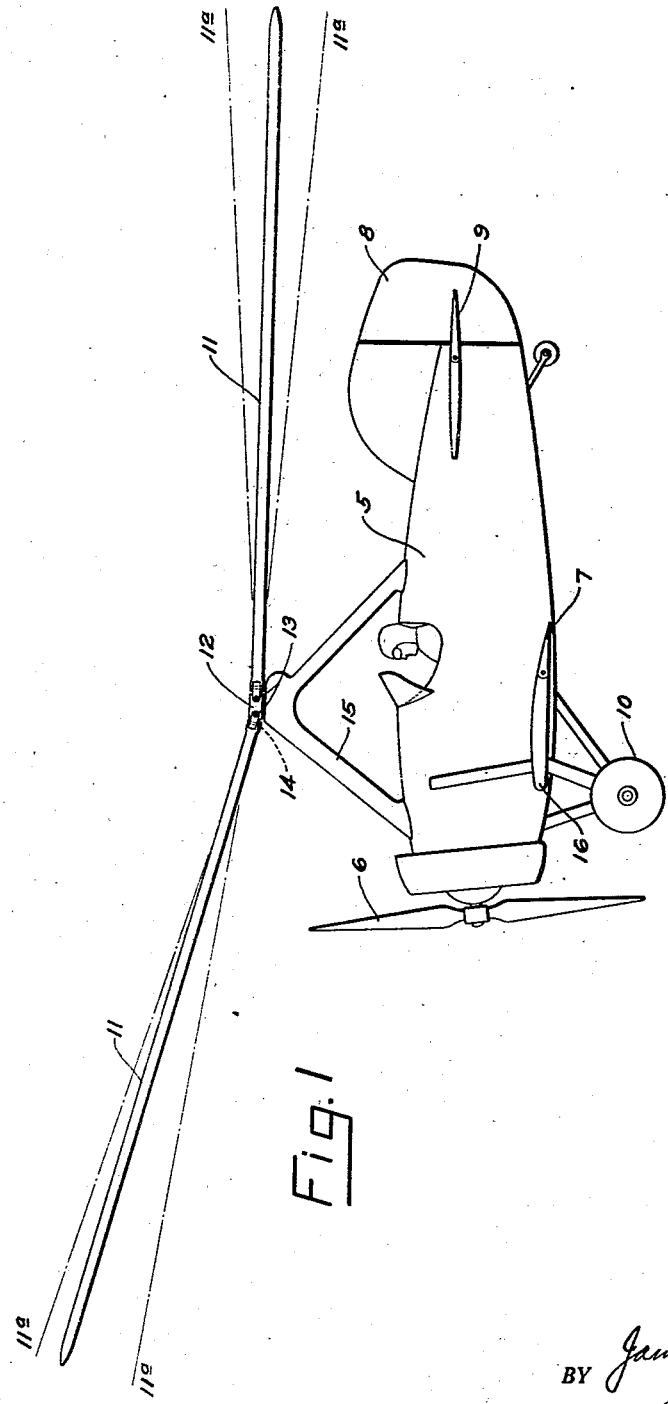
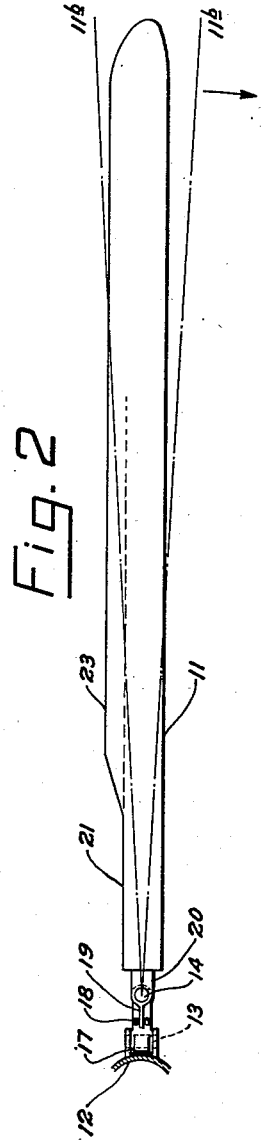
INVENTOR.
BY James Allan Jamieson Bennett
ATTORNEYS

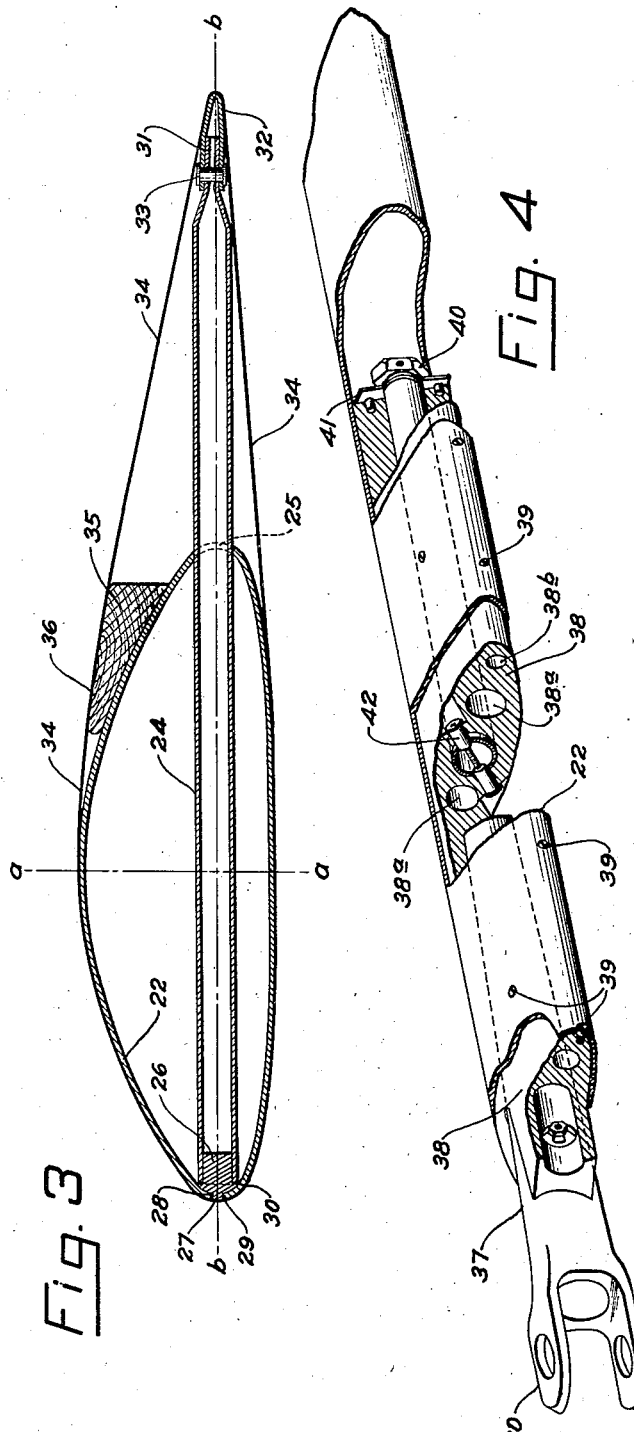

Patented Jan. 12, 1937

2,067,228

UNITED STATES PATENT OFFICE

2,067,228

ROTARY SUSTAINING WINGS FOR AIRCRAFT

James Allan Jamieson Bennett, Genista, Newton Mearns, Scotland, assignor to Autogiro Company of America, Philadelphia, Pa., a corporation of Delaware Application May 22, 1934, Serial No. 727,012
In Great Britain May 24, 1933

18 Claims. (Cl. 244—18)

This invention relates to rotary sustaining wings for aircraft, and while most of its objects and advantages are applicable to and attainable in various types of sustaining rotors, (continuously or only partially and intermittently power-driven) the invention is particularly adaptable to and advantageous in rotors where the blades or wings are mounted about an upright axis in position to be autorotatively turned by the relative flight wind, and in which such blades or wings are pivotally or otherwise flexibly mounted, preferably for indvidual freedom of movement upward and downward (that is, transversely of the rotative path of travel) and preferably also for some individual movement in a direction generally fore and aft in the general rotative path of travel.

The general purposes of the present invention will be better understood if one or two prior types of construction be briefly considered.

In certain sustaining rotors as heretofore built, an example of which is shown in prior Patent No. 1,950,080, of J. de la Cierva, the rotor blade or wing incorporated a substantially cylindrical steel tube or spar, of high tensile strength, with a fairing rigidly attached thereto to form an aerofoil section, the diameter of the tube being slightly less than the maximum thickness of the aerofoil section, and the thickness of the tube wall being made sufficient to take the centrifugal load and the maximum bending and torsion to which the blade or wing is subjected, in operation. While the foregoing involves various advantages it may also be noted that numerous ribs and other elements were necessarily employed in such structures, as may be seen in another patent of J. de la Cierva, No. 1,949,785.

Another prior arrangement is illustrated in co-pending Cierva application, Serial No. 622,634, filed July 15th, 1932 (issued as Patent No. 1,999,136), in which, for simplification as compared with the multi-ribbed structures, and to attain certain other decided advantages, the rotor blade as a whole is of metal, drawn or formed to a full aerofoil section, with little or no internal bracing.

The present invention involves certain of the advantages of several such general types of prior construction, plus additional advantages; and eliminates some of their possible disadvantages.

In accordance with my invention, the aerofoil shape of the sustaining wing is in large part formed by the tubular metallic element itself, or stated another way, the wing incorporates a metal spar composed of tubing of aerofoil section over the leading portion of the wing, such external aerofoil tube, itself, in large part taking the loads which in prior types of rotary wings were taken by the internal cylindrical spar. A skeleton framework extending rearwardly of this aerofoil tube, and covered by a fairing which may also enclose the tube itself, is preferably employed only for completion of the trailing portion of the wing.

The rotary wing of this invention is further preferably of high aspect ratio, and preferably (though not necessarily) of uniform, or substantially uniform cross-sectional contour and pitch, throughout a major portion of its length. Furthermore, the invention contemplates, in its employment of the aforementioned tubular spar of aerofoil shape, the formation of said spar of an elongated cross section which may be made symmetrical about a minor axis near the maximum ordinate of the aerofoil section. With such a construction, as compared with prior practice, a greater proportion of the total weight of the blade or wing is used for the tubular member which takes the main stresses, and a smaller proportion for the members whose chief purpose is to act as a fairing (that is, the trailing portion of the wing, and the wing covering); and the manufacture of the spar itself is simplified as compared with the manufacture of the metal blade of said co-pending application.

Certain other objects and advantages of the invention may here be stated, in a general way, as follows:

(a) As to manufacture, the blade or wing can be made more uniform and true to shape than formerly, which is a substantial advantage especially in autorotative rotors, to assure the best autorotational action over the wide range of angles to which the rotor and the individual wings are subjected in varying styles and attitudes of flight, and to obtain maximum efficiency.

(b) The manufacture of such wings is substantially simplified and made less expensive.

(c) The wing, and particularly the leading edge thereof, is much less liable to be damaged or broken. Furthermore, the increased thickness of the nose section which is part of the spar naturally gives a strong structure which is not readily bent during handling and would not be affected by weather conditions as might a plywood structure as sometimes formerly used.

(d) The rigidity of the wing (for a given total weight) in the plane of rotation and in torsion may be increased, without sacrifice of any desired degree of flexibility in the plane of lift, i. e., transversely of the general rotative path.

(e) The weight of the fairing may be reduced to a minimum, and as a result, where desired, the sectional center of gravity of the wing may be located farther forwardly than heretofore convenient or possible in a wing of certain particular shapes or profiles.

(f) For a given weight of blade, the centrifugal load factor is increased; that is, more of the total weight of the wing may be put into the spar, so that for a given weight the blade spar strength against flight loads is greater.

(g) Where it is desired to make the root portion of the wing of narrower chord and/or of a sectional contour differing from the main portion of the wing, this may be accomplished by the present invention much more simply than heretofore, since the cross-sectional formation of the main tube itself may be made to such a profile (preferably symmetrical) as is desired for the root portion of the wing, and of such shape that the forward half of the section approximates the desired profile of the nose portion of the entire wing; and the fairing in the main or outer portion of the wing may then be built up as desired for completing any particular profile in that portion.

How the foregoing, together with other objects and advantages which will hereinafter appear (as well as such as will occur to those skilled in the art) are attained by the present invention, will be more clearly understood from the following description, taken together with the accompanying drawings, in which drawings:—

Figure 1 is a somewhat diagrammatic side elevational view or outline of a machine of the autorotative wing type, to which my invention is applied, illustrating the up-and-down or flapping movements of the wings;

Figure 2 is a plan view of one of the wings and of its mounting and support on the hub, illustrating fore-and-aft movements of the wing;

Figure 3 is a transverse section through a wing built in accordance with this invention, the same being a view on a larger scale than, and substantially along the line 3—3 of Figure 5;

Figure 4 is a fragmentary perspective view (on a scale intermediate that of Figure 3 and that of Figure 5), partly in section and with parts broken away to show the internal construction, and illustrating one form of mounting or root fitting for connecting the blade or wing to the hub or axis member of the rotor;

Figure 5 is a fragmentary skeleton plan view showing, inter alia, a modified arrangement for connecting the blade or wing to the hub, it being understood that in the actual construction the full length of the wing shown in Figure 5 would ordinarily be about twice as long as there shown, in proportion to the chord, (the middle portion of the wing being broken out in this figure); and Figure 6 is a view of the spar construction, per se, taken about on the line 6—6 of Figure 5.

By reference first to Figures 1 and 2, it will be seen that I have illustrated an aircraft embodying a fuselage 5, a propeller 6, ailerons 7, rudder 8 and elevators 9, and having landing gear 10 and a primary means of sustention comprising a normally freely rotative rotor made up of a plurality of autorotative wings 11 which are pivotally mounted on a normally freely rotative hub 12, as by means of flexible connections which may take the form of individual horizontal pivot pins 13 and individual pivot pins 14, which latter lie substantially in planes containing the axis of the hub. The rotor is preferably mounted above the body or fuselage by means of a pyramid or pylon 15, and the machine may also be provided with small supplemental fixed wings 16, if desired. Stop devices 17 adjacent the hub may be used to limit the movements (including droop of each wing when at rest) about pivot 13; and stop devices 18 co-operating with an arm 19 fast with the wing fork 20 may be employed to limit movements (of the wing when at rest) about pivot 14.

In such a machine, it will be observed that the rotary sustaining wings 11 are preferably permitted substantially free and independent oscillation or swinging movements on their horizontal and upright pivots, (as indicated at 11a in Fig. 1 and at 11b in Fig. 2) under the influence of varying flight forces, as well as allowed normally to rotate freely by virtue of the relative flight wind. In such operation not only does the rotor as a whole encounter the air-flow at widely varying angles (dependent, for instance, upon the angle of flight, which may vary between high speed forward flight and vertical descent) but also the individual blades of the rotor are subject to varying aerodynamic angles of attack, even when they are set on the hub at a predetermined physical pitch or incidence setting, and they are further subject to different angles of the air-flow, considered with relation to the longitudinal axis of the wing in the plane of the wing itself, and to differences in the pressure encountered and in the location of the center of pressure, particularly as to the position of the center of pressure lengthwise along the wing, such center of pressure shifting in and out along the wing periodically as the wing rotates. In addition, it should be noted that when the wing is rotating rearwardly with respect to the direction of flight, the root portion 21 thereof, since it rotates in a path of such small diameter, may actually be rotating at slower speed than the top speed of the craft, at which time such portion may encounter a wholly or partially reversed flow of air. The foregoing and various other operating characteristics are of importance in their bearing upon my improved wing construction.

By reference to Figures 3 and 4, it will be seen that the rotary wing comprises a metallic tubular spar 22 of elongated cross section which is preferably symmetrical at each side of the minor axis a—a, and which, as best seen in Figure 3, presents a leading edge portion, or nose, of aerofoil form. From Figure 2 it will be observed that the entire profile of this tube is employed as the entire aerofoil-defining surface of the inner region or root portion 21 of the wing, (which I find to be an especially efficient contour for that portion) while the main or outer portion 23 of the wing, which is of wider chord, is widened by means of a built-up trailing edge structure, as follows:

Extending in the direction of the major axis b—b of the cross section of the spar 22 are a number of tubes 24 (best seen in Figures 3 and 5) positioned at intervals along the length of the main portion of the wing. These tubes are preferably let into the aeroform spar, from the rear, and accurately fitted in apertures 25 drilled in the rear edge of the spar for that purpose. The forward end of each tube 24 may be fitted with a positioning member or plug 26, presenting a projection 27 which engages an aperture 28 in the leading edge of the spar. Said parts may be secured together by any suitable means, as by welds 29 and 30; or alternatively, or in conjunction with such securing, the tubes 24 may be held in place by the external wing covering, later to be referred to.

It should be mentioned that the said tubes, ribs or transverse members 24, may be easily and cheaply formed of standard commercial stock tubing, and can be readily flattened at their rear ends as indicated at 31, for attachment of the trailing edge strip. The trailing edge of the blade is constituted by a V or channel-shaped metal strip 32 riveted or otherwise secured as at 33, to the said flattened rear ends of the tubes 24.

Since the main tube 22, of which the wing is composed, is not symmetrical, considered with respect to its camber above and below its major axis b—b, but is more or less flattened at the lower face of the wing, it will be observed (from Figure 3) that a suitable contour for the lower face of the trailing portion of the wing may be made simply by stretching a suitable covering 34 from the spar 22 to the trailing edge 32. On the upper face, however, it is desirable to employ a longitudinal member or filler piece 35 (preferably of balsa wood), having a concave surface to fit the rear upper face of the spar 22 and a slightly convex upper surface 36, in order to carry the upper contour of the wing, at the proper camber, back almost to the rear edge of the tube 22. The block or strip 35 may be secured to the main tube 22 in any suitable manner, as by cementing it thereon.

The main portion 23, of the wing, is finally formed by a covering material, such as linen or other fabric 34, which when doped, normally has sufficient tension to keep the trailing edge 32 and the tubes 24 in proper position with respect to the main tubular spar 22. Such fabric may either be pulled lengthwise on to the wing as a sheath, before doping, or it may be tightly wrapped around the blade, or sewed thereover, and then doped.

Referring particularly to Figure 4, the attachment of the wing to its pivot mounting (of Figure 2) may be by means of the forked parts 20, formed at the inner or root end of a tube 37, penetrating a cored metallic block 38, fitted into the root end of the main tubular spar 22, the block 38 being of the same cross-sectional profile as the interior of the said tubular spar, and being secured therein by any suitable means such as the screws 39 which penetrate apertures in the wall of the spar and are threaded into the block 38.

The tube 37 tapers toward its outer end, which is screw-threaded for engagement with a nut 40 abutting on a plate 41 attached to the outer end of the block 38. Although the main spar 22 may be provided with apertures for the purpose of inserting pins 42, I prefer to insert these pins, (which penetrate apertures in the block 38 and tube 37 to anchor them together) prior to inserting such assembly into the main tubular spar 22.

In the modification shown in Figures 5 and 6, although most of the elements are similar to those just discussed, the innermost root end 22b of the spar 22a is formed to a circular cross section for direct connection to the cylindrical steel tube 37a. The fitting 37a may be provided with forks 20a for attachment of the blade to the mounting pivot, and at its outer end (within the spar 22a) it may be flared as at 37b, the cylindrical portion 22b of the spar being spun down to a smaller diameter 22c to a tight fit on the cylindrical fitting 37a, and clamped thereon by means of the split clamps 43. In this way, a secure mounting of the rotor blades is effected, without the necessity for piercing the mounting fitting itself or the root end of the main spar; and it will also be seen, from Figure 6, that another advantage of this arrangement is the increased diameter to which the spar is formed by making it of circular section near the root, whereby greater stiffness for the cantilever support of the blade at the root end (as against drooping when at rest) is obtained, with no increase in the amount of metal at that portion of the main spar or tube.

In either the form of construction illustrated in Figures 1 to 4, or the form of construction illustrated in Figures 5 and 6, the internal construction of the tip of the blade (which is not shown in Figure 2 because of the covering sheath of fabric) may be formed by a separate hollow metallic piece 44 (as seen in Figure 5) which may be secured to the main tube by means of screws or pins 45, and to the trailing edge strip by a screw or pin 46; and it may here be noted that the tubular ribs 24 may be of sufficient strength and stiffness to support not only the main trailing edge strip and fairing but also to aid in carrying the trailing edge portion and tip 44 as against the action of centrifugal force.

In either form of construction, the main tube wall is made rigid enough to maintain its shape, under all pressure and other operating conditions encountered, the tube preferably being constructed of a tough, light-weight, non-corrosive alloy, any suitable available alloys being used for the purpose, such as an aluminum alloy or a magnesium alloy. Taking into account the lower stresses allowable in such material, the entire blade need not necessarily be heavier than one which is built up by an external fairing upon an internal cylindrical steel tube. A large amount of coring as indicated at 38a and 38b, in the wing fitting block, is also employed, to lighten the structure (in the form shown in Figure 4) while still maintaining adequate strength and stiffness in the inner portion of the wing, especially as against the weight of the blade when supported from the root end.

In addition to various advantages over prior forms of so-called "built-up" blades, (such as the elimination of a multiplicity of wood ribs and the reduction in number, variety, complexity and cost of parts); and in addition to a number of advantages over prior forms of metallic blades, (such as better distribution of weight, smoother contour and greater strength and/or stiffness where needed, etc.); the present invention also results in substantially simplifying the forming or drawing of the main tube, as compared with constructions wherein the tubular member constitutes the entire shell of the blade. It will further be obvious from the description of the structure that the invention accomplishes the various objects and advantages discussed at the beginning of this specification.

I claim:—

1. For an aircraft sustaining rotor, an elongated rotative wing having a main longitudinal strength member formed to an aerofoil shape, the full sectional contour of which is substantially that of the inner region of the wing and defines the full wing section in that region, and substantially only the nose half of the sectional contour of which coincides with the contour of the main or outer region of the wing and defines the leading edge thereof.

2. For an aircraft sustaining rotor, an elongated rotative wing having a main longitudinal strength member formed to an aerofoil shape, the full sectional contour of which is substantially that of the inner region of the wing, and a half of the sectional contour of which is substantially that of the nose of the main or outer region of the wing, and a trailing portion secured to said member and extending throughout the major part of the wing's length.

3. For an aircraft sustaining rotor, an elongated rotative wing having a main longitudinal strength member formed to an aerofoil shape, the full sectional contour of which is substantially that of the inner region of the wing, and a half of the sectional contour of which is substantially that of the nose of the main or outer region of the wing, and a rounded wing tip portion secured to the outer end of said member.

4. A rotary blade or wing of high aspect ratio, for aircraft, consisting of a light metallic spar composed of tubing of aerofoil section over the leading portion of the blade and a fairing forming the trailing portion of the aerofoil section which comprises a plurality of stiff transverse members supported solely by said spar, in cantilever, as against the lift and centrifugal flight loads.

5. A rotary blade or wing according to claim 4 having a root fitting constituted by a light metallic block conforming in cross-sectional shape with and secured within the spar.

6. A rotary blade or wing according to claim 4 having a root fitting constituted by a light metallic block conforming in cross-sectional shape with and secured within the spar, and a bifurcated blade-attachment element fixed within said block.

7. A rotary blade or wing according to claim 4 in which the spar is of circular cross section at the root of the blade.

8. For aircraft, a rotary blade or wing of high aspect ratio, consisting of a light metallic spar composed of tubing of aerofoil section over the leading portion of the blade and a fairing forming the trailing portion of the aerofoil section, and in which the spar is traversed by tubes extending in the direction of the major axis of the cross section of the spar, said tubes being flattened at the rear ends for engagement by a metallic strip of channel section forming the trailing edge of the blade.

9. A rotary wing having a large part of its surface formed by a hollow metallic longitudinal spar of aeroform cross section arranged to be supported in cantilever from the root, and a substantially elongated cored metallic block secured in the root end of the spar in position to stiffen the same over such a length that the wing may be supported entirely from its root end.

10. A rotary wing having a large part of its surface formed by a hollow metallic longitudinal spar of aeroform cross section arranged to be supported in cantilever from the root, and a substantially elongated cored metallic block secured in the root end of the spar in position to stiffen the same over such a length that the wing may be supported entirely from its root end, said block having means of attaching the wing to a central rotative hub of a sustaining rotor at a point lying on the central longitudinal line of said aeroform spar, viewed in plan.

11. A rotative wing for an aircraft sustaining rotor, said wing including a main structural member in the form of a tubular element of generally elliptical cross section positioned in the leading edge of the wing and defining the leading edge contour, a plurality of members extended within and rearwardly of said element in a direction generally paralleling the major axis thereof, and wing covering attached to the upper and lower sides of said element and extended rearwardly therefrom toward the rear ends of said members on which the covering is also supported whereby to define the trailing edge contour of the wing.

12. An autorotative sustaining blade or wing, for an aircraft, comprising a main longitudinal tube formed to an elongate aerofoil cross section, which tube in large part constitutes the aerofoil surface of the wing, said tube being of substantially symmetrical profile with relation to its minor axis, and a trailing edge portion including smaller tubes extending transversely through the said tube in the same general plane therewith, and surfacing material supported by the latter tubes.

13. An autorotative sustaining blade or wing, for an aircraft, comprising a main longitudinal tube formed to an elongate aerofoil cross section, which tube in large part constitutes the aerofoil surface of the wing, said tube being of substantially symmetrical profile with relation to its minor axis, and a trailing edge portion including smaller tubes extending transversely through the said tube in the same general plane therewith and flattened at their trailing ends for juncture with a trailing stringer, and surfacing material supported by said stringer and main tube.

14. An aircraft rotor blade comprising a main longitudinal tubular spar of aeroform shape, positioned to form the nose portion of the blade, and having mounting means at its root providing the sole support for the blade, a trailing edge skeleton having parts let into the spar, from its rear edge, said skeleton being supported, in cantilever, solely by said spar, and a superimposed covering over said spar and skeleton in position to tend to maintain the spar and skeleton in assembled relation.

15. An aircraft rotor blade comprising a main longitudinal tubular spar of aeroform shape, positioned to form the nose portion of the blade, and having mounting means at its root providing the sole support for the blade, a trailing edge skeleton having parts let into the spar, from its rear edge, said skeleton being supported, in cantilever, solely by said spar, and a tubular fabric covering slipped endwise over said spar and skeleton and doped in place.

16. A rotative wing for an aircraft sustaining rotor, said wing including a main structural member in the form of an elongated tubular element of generally elliptical cross section the lower side of which is flattened as compared with the upper side, said element being positioned in the leading edge of the wing with the forward portion thereof defining the nose contour of the wing, a trailing edge stringer paralleling the said tubular spar, structural elements carried by the spar and supporting said stringer in a position close to the general plane of the flattened bottom surface of the spar, and covering material forming the trailing surface of the wing and extending from the top and bottom of said spar to said stringer.

17. A rotative wing for an aircraft sustaining rotor, said wing including a main structural member in the form of an elongated tubular element of generally elliptical cross section the lower side of which is flattened as compared with the upper side, said element being positioned in the leading edge of the wing with the forward portion thereof defining the nose contour of the wing, a trailing edge stringer paralleling the said tubular spar, structural elements carried by the spar and supporting said stringer in a position close to the general plane of the flattened bottom surface of the spar, covering material forming the trailing surface of the wing and extending from the top and bottom of said spar to said stringer, and filler means located along the upper surface of the spar within said cover, in position to maintain a convexity of at least a portion of the upper trailing edge surface.

18. For an aircraft sustaining rotor, an elongated rotative wing having a main longitudinal strength member formed to an aerofoil shape, the full sectional contour of which is substantially that of the inner region of the wing and defines the full wing section in that region, and substantially only the nose half of the sectional contour of which coincides with the contour of the main or outer region of the wing and defines the leading edge thereof, said main longitudinal strength member further having an innermost root end portion formed to a substantially circular cross-section for attachment to a rotor hub fitting whereby also to increase its stiffness as against downward drooping when supported in cantilever.

JAMES ALLAN JAMIESON BENNETT.